UNITED STATES PATENT OFFICE.

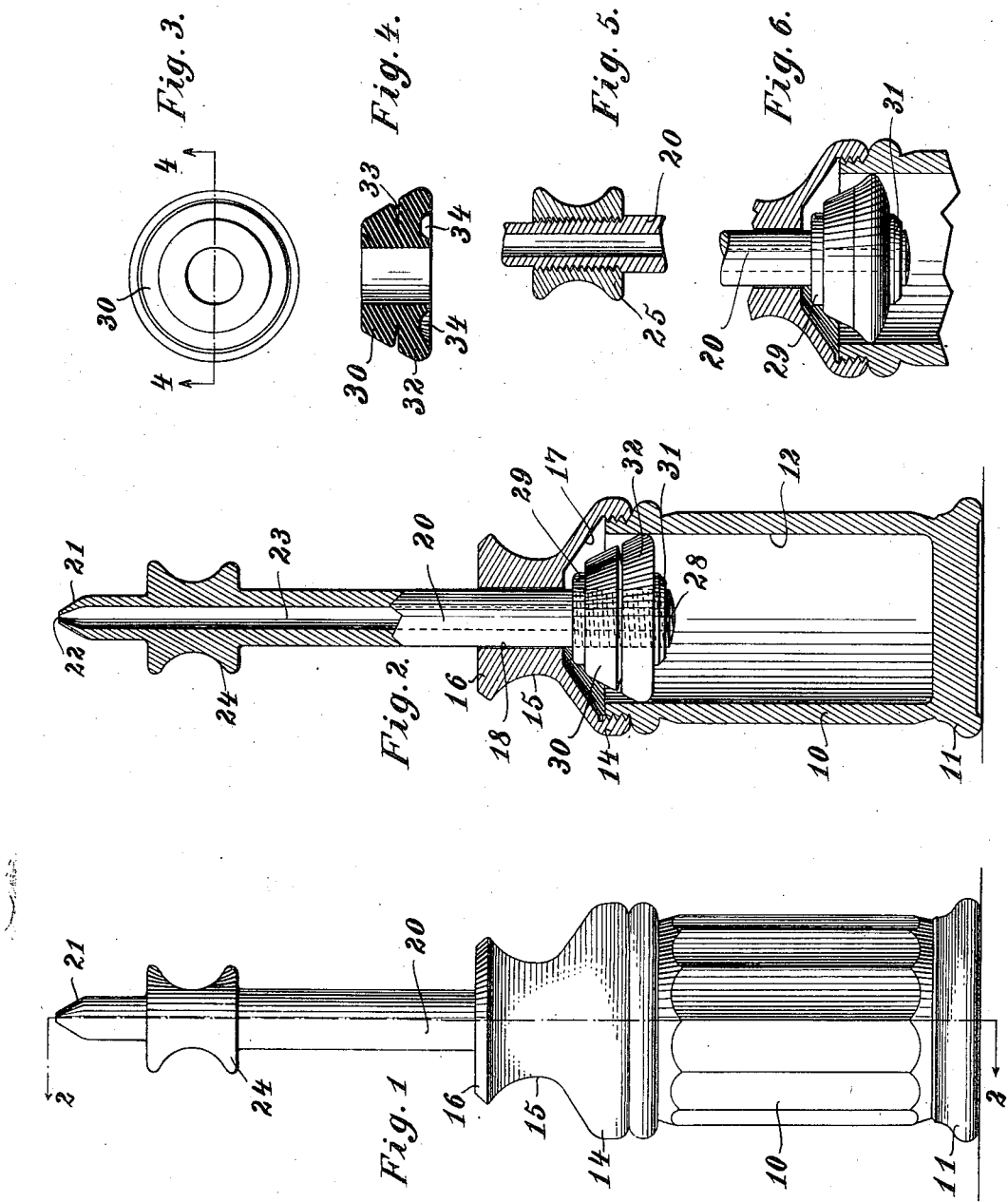

CARL LINKE, OF NEW YORK, N. Y., ASSIGNOR, BY DIRECT AND MESNE ASSIGNMENTS, TO PAUL WITTKOPF, OF NEW YORK, N. Y.

MUSTARD-DISPENSER.

1,214,801. Specification of Letters Patent. Patented Feb. 6, 1917.

Application filed May 24, 1915. Serial No. 29,974.

*To all whom it may concern:*

Be it known that I, CARL LINKE, a subject of the Emperor of Germany, and a resident of New York, in the county of New York and State of New York, have invented certain new and useful Improvements in Mustard-Dispensers, of which the following is a specification.

This invention relates to improvements in devices for containing and dispensing fluid and semi-fluid substances and in particular the composition of condiments known as mustard paste.

One object of the invention is to provide a container for holding such quantities as are customarily provided for table use, without change in the color, flavor or odor, but preserving the content in its original condition, free from the effects of evaporation.

Another object is to combine with the container means for dispensing or serving the exact quantity desired without loss and without the use of a spoon, ladle or any other article or implement whatever.

These and other objects, such as pleasing appearance, ease of operation and cheap construction, are attained by the novel arrangement of parts hereinafter described and shown in the accompanying drawing, forming part of this specification, and in which:—

Figure 1 is a side elevation of a preferred form of the invention. Fig. 2 is a vertical sectional view taken on line 2—2 of Fig. 1. Fig. 3 is a plan view of the flexible plunger. Fig. 4 is a sectional view of the same, taken on line 4—4 of Fig. 3. Fig. 5 is a perspective view of the operating finger grip, and, Fig. 6 is a fragmental sectional view of the plunger, showing the position assumed when under pressure.

The body 10, or container proper, has an enlarged base 11 and may be formed in any shape preferred on its exterior surrounding the cylindrical opening 12 which constitutes the condiment receiving chamber.

A cap 14 is screw-threaded onto the upper part of the body 10 and is formed with a reduced neck 15 suited to receive the fingers of an operator between the main portion and the top flange 16. The interior of the cap has a recess 17 of conical shape terminating in the opening 18, through which the hollow stem or plunger rod 20 passes. The extreme upper end or point 21, of the stem is conically formed and has extending through it a fine perforation 22, communicating with the passage 23 in the body of the stem; the latter being operable in either direction, that is up or down, by the finger grip 24, having flanged ends and a reduced central portion, for drawing the stem outward or pushing it inward.

In the preferred form the finger grip is made integral with the stem as shown in Figs. 1 and 2, but a modification is indicated in Fig. 5 in which the grip 25 is similarly shaped, but screw-threaded so as to be removably engaged with the stem 20 near its upper end.

The lower, inner end 28 of the stem 20 is formed with a shoulder, against which is a washer 29, serving as a backing for the flexible plunger 30, held in place on the inner end of the stem by means of the nut 31. This plunger is formed in a frustoconical shape, in two integrally united sections, the upper section 30 being partially separated from the lower and larger section 32 by the annular groove 33 extending circumferentially around, and its rigidity is further reduced by the annular recess 34 formed in its lower side.

As the edge of the plunger section 32 is larger in diameter than the cylinder 12, it will, when pushed into the cylinder, tightly engage the interior walls, which tendency is accentuated by its shape and construction, the friction of the edge causing the sections to come into close contact and the edge to roll up, forming a tight joint and forcing the contents of the cylinder to escape through the hollow stem in a stream out of the perforation 22. Upon releasing pressure on the stem, the plunger section 32, by virtue of its resiliency, tends to rise at its center until the edge has assumed its normal position, thereby drawing back any small quantity at the point of discharge. A reverse or outward movement of the plunger in the cylinder tends to create a vacuum and retract any of the contents that may have been forced into the stem opening.

In operation, the cylinder having been partially or wholly filled, the cap is screwed into position and the plunger forced to move downwardly by applying pressure in that direction to the finger grip, the whole device being capable of operation with one hand only. When sufficient of the contents has been extruded, the plunger is moved in the opposite-outward-direction, returning the undelivered contents to the cylinder where it is safely held until further required.

Thus it will be seen that fluids of considerable body or viscosity, as oils, syrups, catsups and the like, as well as mustard, may be conveniently dispensed and without loss or soiling of the fingers or surroundings.

Having thus described my invention what I claim as new and desire to secure by Letters Patent, is:—

1. In a device of the class described, the combination with a cylindrically bored container and a cap screw-threaded thereto, of a hollow stem slidable in said cap, said stem being straight and having a contracted orifice, a flexible conical frustum secured to said stem within said container, said frustum having an annular edge portion partially separated from the main portion tightly engaging the bore of said container, and means for securing said frustum to said stem.

2. In a device of the class described, the combination with a container and cap removably engaged therewith, a flexible plunger having an annular groove approximately midway between its upper and lower surfaces the lower wall of said groove lying on a horizontal plane and its upper wall being diagonally disposed to the lower wall and a hollow stem secured to said plunger.

3. In a device of the class described, the combination with a container and cap removably engaged therewith, a hollow stem slidably carried by said cap, a washer carried by said hollow stem adjacent its inner end, a nut removably engaging the inner end of said hollow stem and a flexible plunger compressably confined between said washer and nut on the inner end of said hollow stem with an annular groove disposed on a horizontal plane midway between its upper and lower surfaces.

Signed at New York, in the county of New York and State of New York this twenty-first day of May, A. D. 1915.

CARL LINKE.

Witnesses:
L. ELFMAN,
ERICH GOESTL.